(12) United States Patent
Belcea (10) Patent No.: US 6,904,021 B2
(45) Date of Patent: Jun. 7, 2005

(54) SYSTEM AND METHOD FOR PROVIDING ADAPTIVE CONTROL OF TRANSMIT POWER AND DATA RATE IN AN AD-HOC COMMUNICATION NETWORK

(75) Inventor: John M. Belcea, West Melbourne, FL (US)

(73) Assignee: MeshNetworks, Inc., Maitland, FL (US)

( * ) Notice: Subject to any disclaimer, the term of this patent is extended or adjusted under 35 U.S.C. 154(b) by 20 days.

(21) Appl. No.: 10/087,016

(22) Filed: Mar. 15, 2002

(65) Prior Publication Data

US 2003/0189906 A1 Oct. 9, 2003

(51) Int. Cl.$^7$ .............................................. H04B 7/185
(52) U.S. Cl. ...................... 370/252; 370/318; 370/468; 455/522
(58) Field of Search ................................ 370/252, 465, 370/318, 468; 455/522; 375/377, 224–226

(56) References Cited

U.S. PATENT DOCUMENTS

| | | | |
|---|---|---|---|
| 4,494,192 A | 1/1985 | Lew et al. | 364/200 |
| 4,617,656 A | 10/1986 | Kobayashi et al. | 370/74 |
| 4,736,371 A | 4/1988 | Tejima et al. | 370/95 |
| 4,742,357 A | 5/1988 | Rackley | 342/457 |
| 4,747,130 A | 5/1988 | Ho | 379/269 |
| 4,910,521 A | 3/1990 | Mellon | 342/45 |
| 5,034,961 A | 7/1991 | Adams | 375/130 |
| 5,068,916 A | 11/1991 | Harrison et al. | 455/39 |
| 5,231,634 A | 7/1993 | Giles et al. | 370/95.1 |
| 5,233,604 A | 8/1993 | Ahmadi et al. | 370/60 |
| 5,241,542 A | 8/1993 | Natarajan et al. | 370/95.3 |
| 5,317,566 A | 5/1994 | Joshi | 370/60 |

(Continued)

FOREIGN PATENT DOCUMENTS

| | | |
|---|---|---|
| CA | 2132180 | 3/1996 |
| EP | 0513841 A2 | 11/1992 |
| EP | 0627827 A2 | 12/1994 |

(Continued)

OTHER PUBLICATIONS

Wong et al., "Soft Handoffs in CDMA Mobile Systems", Dec. 1997, IEEE Personal Communications.

(Continued)

Primary Examiner—Chau Nguyen
Assistant Examiner—Van Kim T. Nguyen
(74) Attorney, Agent, or Firm—Gardner Carton & Douglas LLP; Joseph J. Buczynski (57) ABSTRACT

A system and method for selecting an appropriate transmit power and data rate at which a communication signal is transmitted over a link between nodes in a wireless ad-hoc communication network based on factors such as variations in path loss in the link, fading conditions, noise level estimation and overall link quality. The system and method perform the operations of computing path loss in the link based on information provided to the source node from the destination node pertaining to characteristics of a message that was transmitted by the source node and received by the destination node, determining a noise factor at the destination node, and calculating the power level and rate at which the data is transmitted over the link from the source node to the destination node based on the path loss and the noise factor. More specifically, the method calculates the power level based on the path loss, the noise factor and signal fading, and determines the rate based on the calculated power level. Furthermore, the path loss is computed dynamically as conditions of said link change over time. Accordingly, the system and method are capable of determining the proper level of transmit power and data rate for assuring that the destination node will receive the data transmitted by the source node at a reliability of at least 90%.

38 Claims, 6 Drawing Sheets

U.S. PATENT DOCUMENTS

| | | | |
|---|---|---|---|
| 5,392,450 A | 2/1995 | Nossen | 455/12.1 |
| 5,412,654 A | 5/1995 | Perkins | 370/94.1 |
| 5,424,747 A | 6/1995 | Chazelas | 342/70 |
| 5,502,722 A | 3/1996 | Fulghum | 370/69.1 |
| 5,517,491 A | 5/1996 | Nanni et al. | 370/29 |
| 5,555,425 A | 9/1996 | Zeller et al. | 395/800 |
| 5,555,540 A | 9/1996 | Radke | 370/16.1 |
| 5,572,528 A | 11/1996 | Shuen | 370/85.13 |
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | 370/79 |
| 5,623,495 A | 4/1997 | Eng et al. | 370/397 |
| 5,627,976 A | 5/1997 | McFarland et al. | 395/308 |
| 5,631,897 A | 5/1997 | Pacheco et al. | 370/237 |
| 5,634,195 A * | 5/1997 | Sawyer | 455/522 |
| 5,644,576 A | 7/1997 | Bauchot et al. | 370/437 |
| 5,652,751 A | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,706,428 A | 1/1998 | Boer et al. | 395/200 |
| 5,717,689 A | 2/1998 | Ayanoglu | 370/349 |
| 5,745,483 A | 4/1998 | Nakagawa et al. | 370/335 |
| 5,774,876 A | 6/1998 | Wooley et al. | 705/28 |
| 5,781,540 A | 7/1998 | Malcolm et al. | 370/321 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,842 A | 9/1998 | Nagarajet et al. | 395/306 |
| 5,805,977 A | 9/1998 | Hill et al. | 455/31.3 |
| 5,806,003 A * | 9/1998 | Jolma et al. | 455/522 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 395/297 |
| 5,857,084 A | 1/1999 | Klein | 395/309 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,887,245 A * | 3/1999 | Lindroth et al. | 455/69 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/126 |
| 6,064,626 A | 5/2000 | Stevens | 365/233 |
| 6,067,291 A | 5/2000 | Kamerman et al. | 370/338 |
| 6,078,566 A | 6/2000 | Kikinis | 370/286 |
| 6,104,712 A | 8/2000 | Robert et al. | 370/389 |
| 6,108,561 A * | 8/2000 | Mallinckrodt | 455/522 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,132,306 A | 10/2000 | Trompower | 453/11.1 |
| 6,147,975 A | 11/2000 | Bowman-Amuah | 370/252 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | Van Bokhorst et al. | 455/343 |
| 6,208,870 B1 | 3/2001 | Lorello et al. | 455/466 |
| 6,219,343 B1 * | 4/2001 | Honkasalo et al. | 370/335 |
| 6,223,240 B1 | 4/2001 | Odenwald et al. | 710/129 |
| 6,240,294 B1 | 5/2001 | Hamilton et al. | 455/456 |
| 6,243,591 B1 * | 6/2001 | Takemura | 455/522 |
| 6,246,875 B1 | 6/2001 | Seazholtz et al. | 455/432 |
| 6,249,516 B1 | 6/2001 | Brownrigg et al. | 370/338 |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,327,300 B1 | 12/2001 | Souissi et al. | 375/219 |
| 6,341,225 B1 * | 1/2002 | Blanc | 455/522 |
| 6,349,091 B1 | 2/2002 | Li | 370/238 |
| 6,349,210 B1 | 2/2002 | Li | 455/450 |
| 6,366,572 B1 * | 4/2002 | Esterberg et al. | 370/343 |
| 6,456,599 B1 * | 9/2002 | Elliott | 370/254 |
| 6,496,543 B1 * | 12/2002 | Zehavi | 375/295 |
| 6,519,705 B1 * | 2/2003 | Leung | 713/300 |
| 6,574,266 B1 * | 6/2003 | Haartsen | 375/133 |
| 6,597,723 B1 * | 7/2003 | Zeira et al. | 375/130 |
| 6,621,805 B1 * | 9/2003 | Kondylis et al. | 370/329 |
| 2001/0053699 A1 | 12/2001 | McCrady et al. | 455/513 |
| 2002/0028691 A1 * | 3/2002 | Moulsley et al. | 455/522 |
| 2002/0071395 A1 * | 6/2002 | Redi et al. | 370/252 |
| 2002/0168993 A1 * | 11/2002 | Choi et al. | 455/522 |

FOREIGN PATENT DOCUMENTS

| | | |
|---|---|---|
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoffs Algorithms", Jul. 2000, IEEE Journal on Selected Areas in Communications, vol. 18, no. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28–Mar. 3, 1999, $2^{nd}$ Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, no. 2, summer 1998.

Josh Broch, David A. Maltz, David B. Johnson, Yih–Chun Hu and Jorjeta Jetcheva, "A Performance Comparison of Multi–Hop Wireless Ad Hoc Network Routing Protocols", Oct. 25–30, 1998, Proceedings of the $4^{th}$ Annual ACM/IEEE International Conference on Mobile Computing and Networking.

C. David Young, "USAP: A Unifying Dynamic Disributed Multichannel TDMA Slot Assignment Protocol".

Chip Elliott and Bob Heile, "Self–Organizing, Sef–Healing Wireless Networks", 2000 IEEE.

J.J. Garcia–Luna–Aceves and Asimakis Tzamaloukas, "Reversing the Collision–Avoidance Handshake in Wireless Networks".

J.J. Garcia–Luna–Aceves and Marcelo Spohn, "Transmission–Efficient Routing in Wireless Networks Using Link-State Information".

J.J. Garcia–Luna–Aceves and Ewerton L. Madruga, "The Core–Assisted Mesh Protocol", Aug. 1999, IEEE Journal on Selected Area in Communications, vol. 17, no. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales–Hain, "Topology Control of Multihop Wireless Networks using Transmit Power Adjustment".

Ram Ramanathan and Martha E. Steenstrup, "Hierarchically–Organized, Multihop Mobile Wireless Networks for Quality–of–Service Support".

Martha E. Steenstrup, "Dynamic Multipoint Virtual Circuits for Multimedia Traffic in Multihop Mobile Wireless Networks".

Zhenyu Tang and J.J. Garcia–Lung–Aceves, "Collision-Avoidance Transmission Scheduling for Ad–Hoc Networks".

George Vardakas and Wendell Kishaba, "QoS Networking With Adaptive Link Control and Tactical Multi–Channel Software Radios".

* cited by examiner

SYSTEM AND METHOD FOR PROVIDING ADAPTIVE CONTROL OF TRANSMIT POWER AND DATA RATE IN AN AD-HOC COMMUNICATION NETWORK

BACKGROUND OF THE INVENTION

1. Field of the Invention

The present invention relates to a system and method for adaptively controlling the transmit power and data rate at which a communication signal is transmitted between nodes in a wireless ad-hoc communication network. More particularly, the present invention relates to a system and method for selecting an appropriate transmit power and data rate at which a communication signal is transmitted over a link between nodes in a wireless ad-hoc communication network based on factors such as variations in path loss in the link, fading conditions, noise level estimation and overall link quality.

2. Description of the Related Art

In recent years, a type of mobile communications network known as an "ad-hoc" network has been developed. In this type of network, each user terminal (hereinafter "mobile node") is capable of operating as a base station or router for the other mobile nodes, thus eliminating the need for a fixed infrastructure of base stations. Accordingly, data packets being sent from a source mobile node to a destination mobile node are typically routed through a number of intermediate mobile nodes before reaching the destination mobile node. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and thus communicate with other types of user terminals, such as those on the public switched telephone network (PSTN) and on other networks such as the Internet. Details of these types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. patent application Ser. No. 09/815,157 now U.S. Pat No. 6,807,165 entitled "Time Division Protocol for an Ad-Hoc, Peer-to-Peer Radio Network Having Coordinating Channel Access to Shared Parallel Data Channels with Separate Reservation Channel", filed on Mar. 22, 2001, and in U.S. patent application Ser. No. 09/815,164 entitled "Prioritized-Routing for an Ad-Hoc, Peer-to-Peer, Mobile Radio Access System", filed on Mar. 22, 2001, the entire content of each of said patent applications being incorporated herein by reference.

As can be appreciated by one skilled in the art, when a node sends packetized data to a destination node, the node typically checks its routing table to determine whether the destination node is contained in its routing table. If the destination node is contained in the node's routing table, the data is transmitted via a path that leads to the destination node. If the destination node is not listed in the node's routing table, then the packet is sent to one or more other nodes listed in the node's routing table, and those other nodes determine if the destination table is listed in their routing tables. The process continues until the data packet eventually reaches the destination node.

In these types of ad-hoc networks, data transmitted from one station to another is affected by adverse conditions. These conditions may prevent the transmitted data from being correctly received by the destination station. In order to provide a high reliability of data transfer, the transmit power and data rate must be adjusted to proper levels. Although high transmit power and low data rate assure that the signals are received by the receiving station at the highest reliability, they cannot be used without having negative effect on network operation. For example, because high transmit power enables the transmitted signal to be received at distances far away from the transmitter, this prevents the same frequency channel to be used for making other connections between other stations within the range of the high power transmit signal. Furthermore, transmission at a lower data rate typically uses higher energy than at a higher data rate, while requiring a longer period of time for transmitting the same amount of data that could be transmitted quicker at a higher data rate.

Accordingly, a need exists for a system and method for selecting the most appropriate transmit power and data rate at which a communication signal is transmitted over a link between nodes in a wireless ad-hoc communication network.

SUMMARY OF THE INVENTION

An object of the present invention is to provide a system and method for adaptively controlling the transmit power and data rate at which a communication signal is transmitted between nodes in a wireless ad-hoc communication network.

Another object of the present invention is to provide a system and method for selecting an appropriate transmit power and data rate at which a communication signal is transmitted over a link between nodes in a wireless ad-hoc communication network based on factors such as variations in path loss in the link, fading conditions, noise level estimation and overall link quality.

These and other objects are substantially achieved by providing a system and method for determining a power level and rate at which data is transmitted over a link between source and destination nodes in a wireless ad-hoc communication network. The system and method perform the operations of computing path loss in the link based on information provided to the source node from the destination node pertaining to characteristics of a message that was transmitted by the source node and received by the destination node, determining a noise factor at the destination node, and calculating the power level and rate at which the data is transmitted over the link from the source node to the destination node based on the path loss and the noise factor. More specifically, the calculating calculates the power level based on the path loss and the noise factor, and determines the rate based on the calculated power level. Furthermore, the path loss is computed dynamically as conditions of said link change over time.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
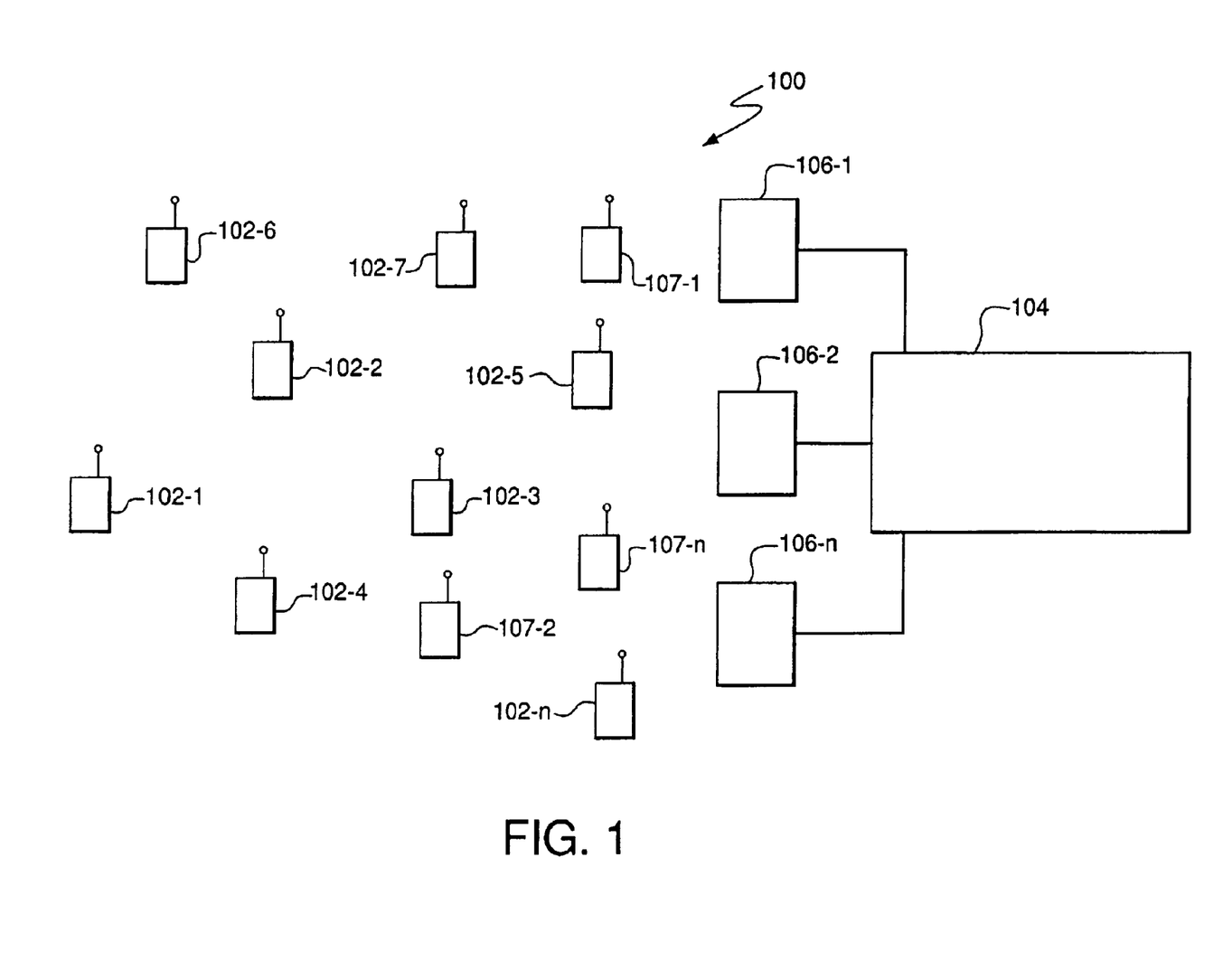
FIG. 1 is a conceptual block diagram of an example of an ad-hoc wireless communications network employing a system and method for evaluating the integrity of links between nodes according to an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes or mobile nodes 102), and a fixed network 104 having a plurality of access points 106-1, 106-2, . . . 106-n (referred to generally as nodes or access points 106), for providing the nodes 102 with access to the fixed network 104. The fixed network 104 includes, for example, a core local access network (LAN), and a plurality of servers and gateway routers, to thus provide the nodes 102 with access to other networks, such as other ad-hoc networks, the public switched telephone network (PSTN) and the Internet. The network 100 further includes a plurality of fixed routers 107-1 through 107-n (referred to generally as nodes or fixed routers 107) for routing data packets between other nodes 102, 106 or 107.

Figure 2:
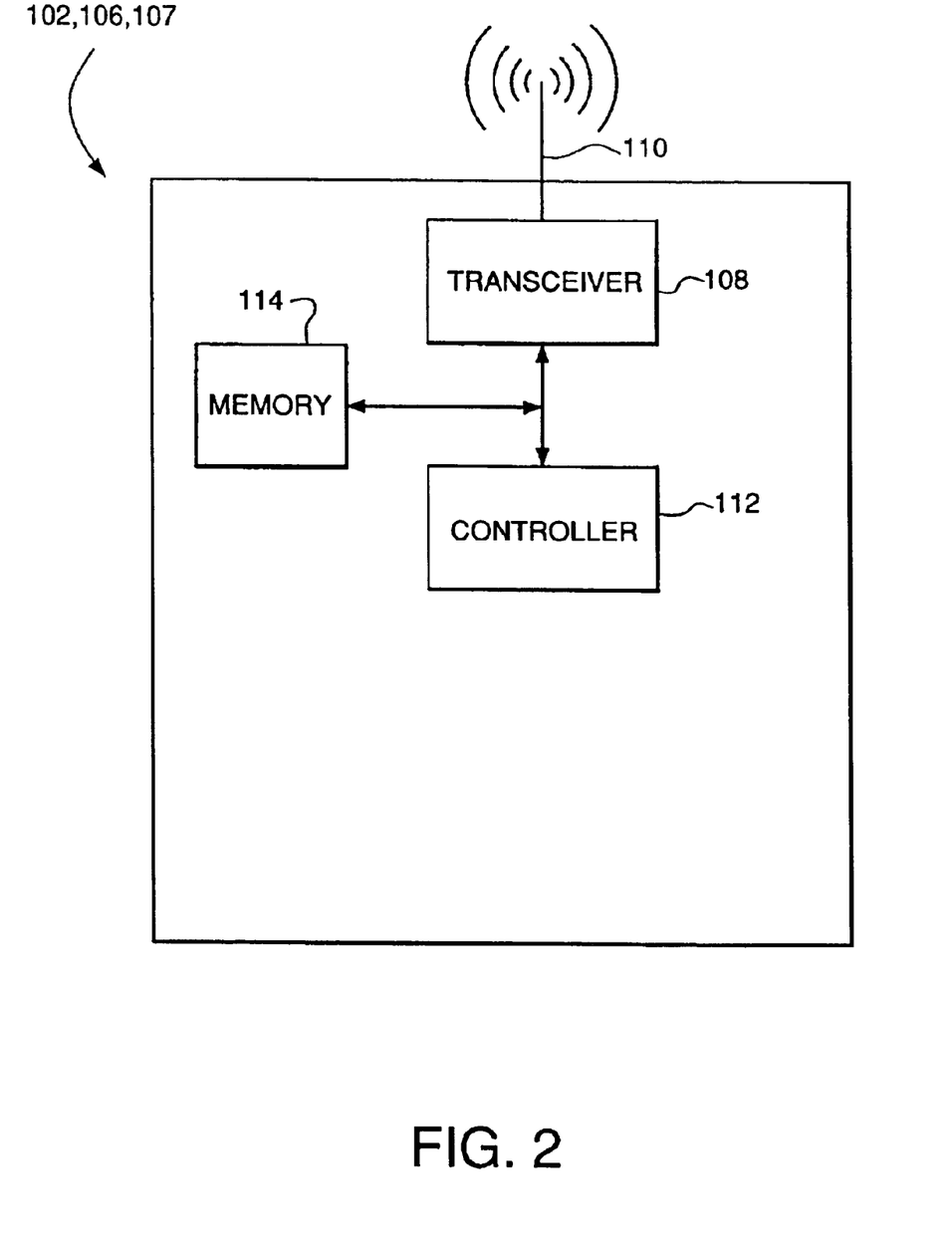
FIG. 2 is a block diagram illustrating an example of components of a node employed in the network shown in FIG. 1.

As can be appreciated by one skilled in the art, the nodes 102, 106 and 107 are capable of communicating with each other directly, or via one or more other nodes 102, 106 or 107 operating as a router or routers for data packets being sent between nodes 102, as described in U.S. Pat. No. 5,943,322 to Mayor and in U.S. patent application Ser. Nos. 09/897,790, 09/815,157 and 09/815,164, referenced above. Specifically, as shown in FIG. 2, each node 102, 106 and 107 includes a transceiver 108 which is coupled to an antenna 110 and is capable of receiving and transmitting signals, such as packetized data signals, to and from the node 102, 106 or 107, under the control of a controller 112. The packetized data signals can include, for example, voice, data or multimedia.

Each node 102, 106 and 107 further includes a memory 114, such as a random access memory (RAM), that is capable of storing, among other things, routing information pertaining to itself and other nodes 102, 106 or 107 in the network 100. The nodes 102, 106 and 107 exchange their respective routing information, referred to as routing advertisements or routing table information, with each other via a broadcasting mechanism periodically, for example, when a new node 102 enters the network 100, or when existing nodes 102 in the network 100 move. A node 102, 106 or 107 will broadcast its routing table updates, and nearby nodes 102, 106 or 107 will only receive the broadcast routing table updates if within broadcast range (e.g., radio frequency (RF) range) of the broadcasting node 102, 106 or 107. For example, assuming that nodes 102-1, 102-2 and 102-7 are within the RF broadcast range of node 102-6, when node 102-6 broadcasts its routing table information, that information is received by nodes 102-1, 102-2 and 102-7. However, if nodes 102-3, 102-4 and 102-5 through 102-n are out of the broadcast range, none of those nodes will receive the broadcast routing table information from node 102-6.

The manner in which a node 102, 106 or 107 controls transmission of data packets to another node 102, 106 and 107 in accordance with an embodiment of the present invention will now be described. Specifically, when a node 102, 106 or 107 is to transmit data packets to another node, the controller 112 of the transmitting node 102, 106 or 107 will control the transceiver 108 to transmit the data packets at a particular transmit power and data rate. Adaptive Control of the Transmit Power (ATP) is the algorithm performed by the controller 112 of the transmitting node 102, 106 or 107 that is responsible for identifying the transmit power and data rate that can be used for assuring the most reliable reception at correspondent site while using as little energy as possible, as will now be described.

Figure 3:
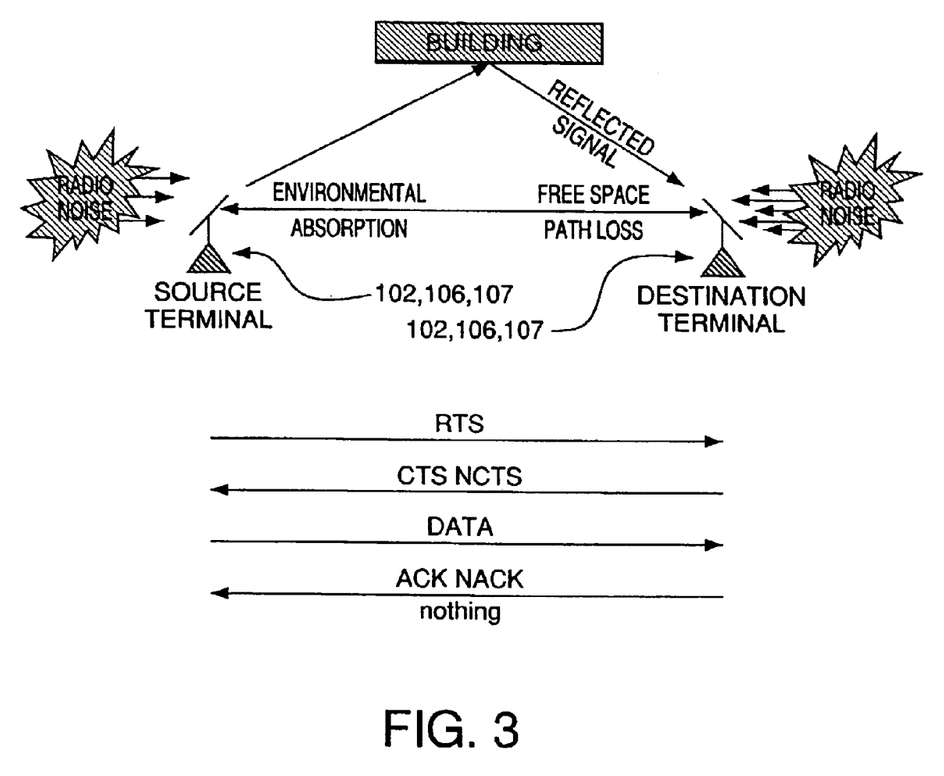
FIG. 3 is a conceptual block diagram illustrating an example of the different types of interference than can affect a signal being transmitted from a source node to a destination node in the network shown in FIG. 1.

For example, FIG. 3 shows a typical data transfer in ad-hoc environment between two stations (e.g., nodes 102, 106 or 107 shown in FIG. 1) identified as the Source Terminal and the Destination Terminal. The reception at each end of the connection could be affected by adverse conditions. Between the Source Terminal and the Destination Terminal, the signal strength suffers a loss due to propagation (i.e., free space loss) and environment absorption (i.e., vegetation, buildings, fixed or moving objects). Furthermore, sources of electromagnetic radiation transmitting signals or noise on the same frequency band as the received signal can adversely affect the received signal. In addition, the received signal may also arrive following more than one route, which causes signal fading. In summary, many conditions may prevent the transmitted message from being always received correctly.

As can be appreciated by one skilled in the art, when the Source Terminal has some data to transmit to the Destination Terminal, the Source Terminal sends a Ready to Send (RTS) message as shown in FIG. 3. If the Destination Terminal is ready to receive the data, it answers with the Clear To Send (CTS) message. However, the Destination Terminal may answer with a Not Clear to Send (NCTS) message if there is no data channel available at the time. Furthermore, it is possible that the Destination Terminal does not answer the RTS request because the Destination Terminal does not receive the RTS request, for example, when the Destination Terminal is busy receiving or transmitting different data, or if the interference at the Destination Terminal is too strong. In this event, the Source Terminal resends the RTS message after a random period of time.

If the Destination Terminal answers with a CTS message, the Source Terminal tunes on data channel and starts sending data. On the other end of the connection, the Destination Terminal tunes on the same data channel and starts receiving that transmitted data.

When the data transfer is completed, the Destination Terminal answers back with an Acknowledgment (ACK) message if it received the data correctly, or a Not Acknowledgment (NACK) message if any of the data was received with errors. Both messages contain information about the quality of the received message, such as a Received Signal Strength Indicator (RSSI), Post Detection Signal Quality (PDSQ), Bit Error Rate (BER) and the multipath count (MPC). If, however, after successfully exchanging RTS and CTS messages, the Destination Terminal is not able to receive any data due to, for example, strong interference from another neighbor or signal fading during the reception of the sync sequence, the Destination Terminal cannot synchronize on the transmitted signal and thus cannot answer the Source Terminal with an ACK or NACK message. After waiting for a period of time, the Source Terminal determines that there is no response from the Destination Terminal (i.e., a "NO RESPONSE" condition), and re-sends the RTS message after a random delay.

The role of ATP in accordance with an embodiment of the present invention is to control the data rate and the transmit power when transferring data from the Source Terminal to the Destination Terminal in such way that the highest possible data rate is used, the lowest energy is used, and the transmit power and data rate are computed to assure at least a 90% probability that the Destination Terminal will correctly receive the message. As can be appreciated by one skilled in the art, the reliability (i.e., probability of receiving data correctly) of 100% can be achieved only when using infinite energy, meaning that 100% reliability is not practical. ATP in accordance with an embodiment of the present invention uses as much energy as needed for achieving more than 90% reliability for each individual transmission. When a data packet is not received by the Destination Terminal, the same data packet is retransmitted up to five times in this example, which realizes a probability of about 99.999% that the data packet will be correctly received by the Destination Terminal.

In order to determine the proper transmit energy, the ATP computes or estimates several elements associated to the quality of the received signal, namely, dynamic variation of the path loss, fading span and noise level at the Destination Terminal, as will now be described.

Path Loss

In accordance with an embodiment of the present invention, path loss is computed as the difference between the power level of the received signal and the power used for transmitting the received signal. The power used for transmitting the message is known from the history associated with the Destination Terminal, and the signal strength at the Destination Terminal is characterized by the RSSI, PDSQ and MPC. The Destination Terminal includes information pertaining to the RSSI, PDSQ and MPC in the ACK and NACK messages that the Destination Terminal sends to the Source Terminal.

Figure 4:
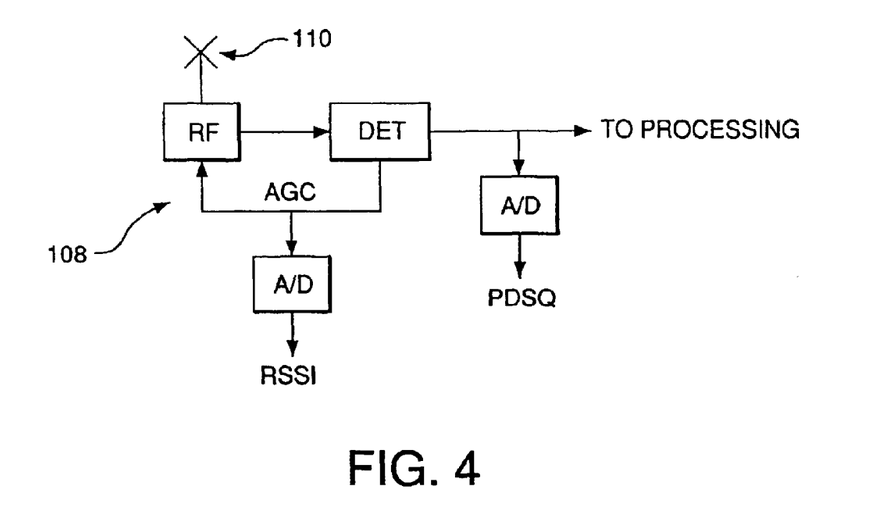
FIG. 4 is a conceptual block diagram illustrating components of the transceiver of a destination node as shown in FIG. 2, which produce a Received Signal Strength Indicator (RSSI) and Post Detection Signal Quality (PDSQ)

The level of the received signal is computed based on RSSI and PDSQ measurements. Both measurements are readings of A/D converters in the transceiver 108 (see FIG. 4) of the Destination Terminal, and are scaled to [0:31] range in this example. That is, in this example, the ACK and NACK messages each have reserved 5 bits for RSSI and PDSQ measurements which allows the representation of 32 distinct values, namely, the values ranging from 00000 (decimal "0") through 11111 (decimal "31"). The strength of the received signal is estimated using linear approximations, and is computed from RSSI data only when RSSI has a large value. Specifically, as can be appreciated by one skilled in the art and as shown in FIG. 4, the RSSI count is a measure of the Automatic Gain Control (AGC) signal that controls the radio frequency (RF) amplification of the received energy.

Specifically, the AGC maintains the received signal as constant as possible at detection/demodulation. A first A/D converter provides the numerical expression of the value of AGC, which is the RSSI. The level of the signal leaving the detection stage DET is also sampled with a second A/D converter to provide the PDSQ. As long as the received signal is strong enough, PDSQ is constant or relatively constant. A stronger received signal results in a higher AGC and RSSI. However, when the received signal is weak, AGC and RSSI are zero, and PDSQ becomes smaller than the constant value characterizing the reception of a strong signal. Accordingly, when RSSI has small values, PDSQ is used instead of RSSI for computing the received signal strength.

Dynamic Variation of the Path Loss

The instantaneous path loss between the Source and Destination Terminals is computed as the difference between the transmitting power at which the signal is transmitted by the Source Terminal and the signal strength at which the transmitted signal is received by the Destination Terminal. The signal strength is evaluated based on the information provided to the Source Terminal in the ACK or NACK messages sent by the Destination Terminal. Subtracting the strength of the received signal from the level of the transmit power provides the value of the path loss, which includes the free space loss as well as the absorption caused by a medium as discussed above. In a mobile environment, the distance between the Source and Destination Terminals changes continuously, meaning that the path loss also changes. ATP tries to predict the variation of the path loss in time by estimating the coefficients of the equation:

$$pl(t) = f_0 + f_1(t - t_0) \quad (1)$$

where $t_0$ is the time when the first message was transmitted to the Destination Terminal, and t the time that the present message is being sent. The coefficients $f_0$ and $f_1$ of this function are computed using the Least Square Method (LSM) which is known in the art, but any linear or non-linear model can be used. The method has as scope to find the values of the two parameters $f_0$ and $f_1$ for which $$\sigma^2 = \sum_{i=1}^{n} (f_0 + f_1(t_i - t_0) - pl(t_i))^2 \quad (2)$$

has the smallest value (the smallest square of sigma). The smallest value of sigma is achieved when its derivative in relation with $f_0$ and $f_1$ are zero. This condition provides a system of two equation with two unknown variables $f_0$ and $f_1$ described below. Solving the system provides the values of the two parameters $f_0$ and $f_1$.

If the connection between two neighbors (e.g., the Source and Destination Terminals) is active for long time, the elements of the LSM matrix can become very large and make it relatively impossible to consider new data. On the other hand, old data is not necessarily accurate anymore and should not be used for making current decisions. Hence, ATP employs the "forget factor" which allows the ATP algorithm to forget the information collected more than a certain length of time ago, by providing each measurement with a variable weight that decreases with time as will now be described.

Specifically, at time $t_n$, the instantaneous path loss is $pl_n$. At that moment the LSM matrix has four elements $$a_{1,1}^{(n)}, a_{1,2}^{(n)}, a_{2,1}^{(n)}, a_{2,2}^{(n)}$$

and two right terms $$b_1^{(n)}, b_2^{(n)}.$$

After receiving n measurements, the associated matrix for LSM while using the forget factor w with the property 0<w<1 for weighting each measurement, is:

$$a_{1,1}^{(n)} = \sum_{i=0}^{n} w^{n-i} \quad (3)$$

$$a_{1,2}^{(n)} = a_{2,1}^{(n)} = \sum_{i=0}^{n} (t_i - t_0)w^{n-i}$$

$$a_{2,2}^{(n)} = \sum_{i=0}^{n} (t_i - t_0)^2 w^{n-i}$$

$$b_1^{(n)} = \sum_{i=0}^{n} pl_i w^{n-i}$$

$$b_2^{(n)} = \sum_{i=0}^{n} pl_i (t_i - t_0) w^{n-i}$$

The process is continuous and the matrix should be updated when receiving any new set of data. Also, the recursive form of previous equations is:

$$a_{1,1}^{(n)} = a_{1,1}^{(n-1)} w + 1 \quad (4)$$

$$a_{1,2}^{(n)} = a_{2,1}^{(n)} = a_{1,2}^{(n-1)} w + (t_i - t_0)$$

$$a_{2,2}^{(n)} = a_{2,2}^{(n-1)} w + (t_i - t_0)^2$$

$$b_1^{(n)} = b_1^{(n-1)} w + pl_i$$

$$b_2^{(n)} = b_2^{(n-1)} w + pl_i(t_i - t_0)$$

In the general case, the $\alpha_{1,1}$ element of the LSM matrix is equal to the number of measurements considered in computation. However, in the present embodiment, the value of $\alpha_{1,1}$ at step n is equal to $$a_{1,1}^{(n)} = \sum_{i=0}^{n-1} w^i = \frac{1-w^n}{1-w}.$$

For very large values of n and because w<1, the value of $\alpha_{1,1}$ element becomes almost equal to $$a_{1,1}^{(n)} = \frac{1}{1-w}.$$

This means that the "forgetting" procedure presented here has almost the same effect as applying the LSM to data associated to a sliding window of size s=1/(1−w). In other words, if a sliding window of size s is used for computing the path loss, the value of the "forget factor" must be equal to a window having the size w=(s−1)/s. Nevertheless, the technique according to the embodiment of the present invention provides almost the same result as the sliding window, and the processing is faster and does not require to store old data. More than that, the most recent collected data has higher weight in computing the values of the two parameters $f_0$ and $f_1$ than old data. As mentioned before, the "forget factor" is a positive number smaller than one and very close to one. For a window of 1000 measurements, the size of the "forget factor" is w=(1000−1)/1000=0.999.

The Span of Short Term Fading

From one measurement to another, the path loss presents significant variations. Specifically, as can be appreciated by one skilled in the art, these variations are caused by multiple factors that include the speed of change of the distance between the Source and Destination Terminals, the speed of various objects moving between Source and Destination Terminals, and so on. The variation has a random character, but its standard deviation is relatively constant for long time.

After computing the $f_0$ and $f_1$ coefficients in the manner described above, ATP identifies the error of the last measurement, which is represented by the difference between the path loss computed by equation (1) above and the path loss computed from the feedback (i.e., RSSI and PDSQ) provided by the Destination Terminal, and then computes the standard deviation of errors. The size of the signal span is computed from the standard deviation of individual measurements that is filtered with Infinite Input Filter (IIF) for preventing sudden jumps.

Noise Level Estimation

If the Destination Terminal is close to a noise source, the received signal may be affected in two ways: (a) not all bits of the message are received correctly, and (b) the value of RSSI is larger than normal due to the high level of electromagnetic radiation. As will now be described with regard to the flowchart shown in FIG. 5 and the graph shown in FIG. 6, ATP attempts to estimate of the noise level at the Destination Terminal based on frequency of "NAK" and "NO RESPONSE" cases in opposition to "ACK" cases as discussed above.

Figure 5:
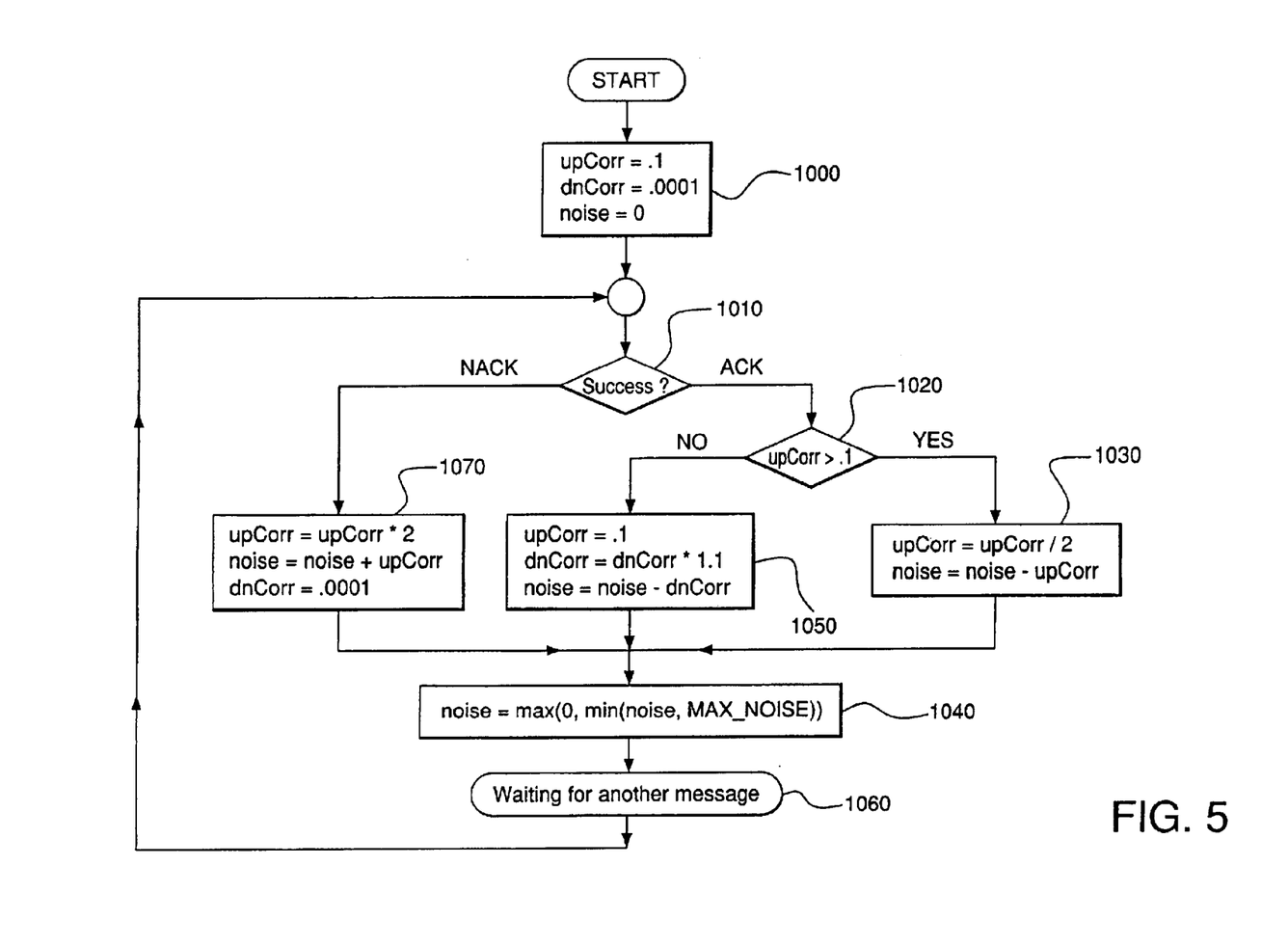
FIG. 5 is a flowchart illustrating an example of operations performed by the ATP in the source node to estimate the noise level at the destination node.

As shown in step 1000 in the flowchart, the noise is estimated using three variables that change value every time a new data is received. These variables are the noise level, the upward correction and the downward correction. The noise level variable shows the currently estimated level of noise. The estimated noise could be smaller than the real level, larger than the real level, or almost correct. The upward and downward corrections are limited by bottom limits which, in this example, are 0.1 dB for the upward correction and 0.0001 dB for the downward correction. The noise level variable in this example begins at zero. The values of these variables are indications of the relation between the estimated level of noise and the real noise level. No more than one of these variables is larger than its bottom limit at any time. When the upward correction is larger than its bottom limit, the estimated noise is probably smaller than the real noise level. However, when the downward correction is larger than its bottom limit, the estimated noise is probably larger than the real noise level. When both variables are at bottom limit, there is no significant noise at correspondent site. The values of these corrections are continuously changing according with the type of occurring situation (favorable or not favorable) as explained below.

When a favorable situation occurs (e.g., the Source Terminal receives an ACK message) in step 1010, the action that the controller 112 of the Source Terminal takes depends on the value of upward correction. If it is determined in step 1020 that the upward correction is higher than its bottom limit (i.e., 0.1), the upward correction is reduced to half (or by any other suitable factor) and is subtracted from the noise level in step 1030. In step 1040, the noise level is then determined to be either zero if the noise level calculated in step 1030 is negative, or the noise level calculated in step 1030 if it is a positive value. However, the noise level cannot be negative and can never exceed the maximum noise level MAX_NOISE, which can be any suitable value such as 50 dB. These conditions are represented by the function max(0, min(noise, MAX_NOISE)) in step 1040. If is determined in step 1020 that the upward correction is smaller or at the bottom limit, in step 1050, the upward correction is reset to 0.1, the noise level is decreased by the downward correction and the downward correction is increased by 10%, or by any other suitable factor. The noise value is then selected in step 1040, and the ATP waits for another message in step 1060. The process returns to step 1010 and repeats when another message is received.

On the contrary, when an unfavorable situation occurs (e.g., the Source Terminal receives an NAK message or NO RESPONSE is detected) in step 1010, the process proceeds to step 1070 where the value of the upward correction is doubled (or increased by any other suitable factor) and is added to the noise level while the downward correction is reset to its bottom limit of 0.0001. The process then proceeds to step 1040 where the noise level is determined as discussed above, and then to step 1060 to await receipt of another message.

As can be appreciated from this description, the algorithm searches for the estimation of the noise level with steps increasing exponentially with the power of two (or any other suitable factor). Hence, the noise level can be identified quickly when a sequence of unfavorable situations occur. Once the noise level is identified, the algorithm maintains the noise level estimate almost constant for some time. Afterward, the algorithm begins attempting to determine if the noise source is still active or not by slowly reducing the estimated noise level. If the attempt is successful, the speed of reduction increases until the new noise level is found or until the estimated noise level becomes zero.

Apparently, the estimation of the noise level value is continuously changed, because at every step, one of the two corrections is either added or subtracted to the previous noise level value. In fact, the two corrections have exponential variations and, when the noise level is correctly identified, they have very small values. Accordingly, when the noise level is correctly identified, the corrections that are applied to the noise level are so small that they have no practical significance.

Figure 6:
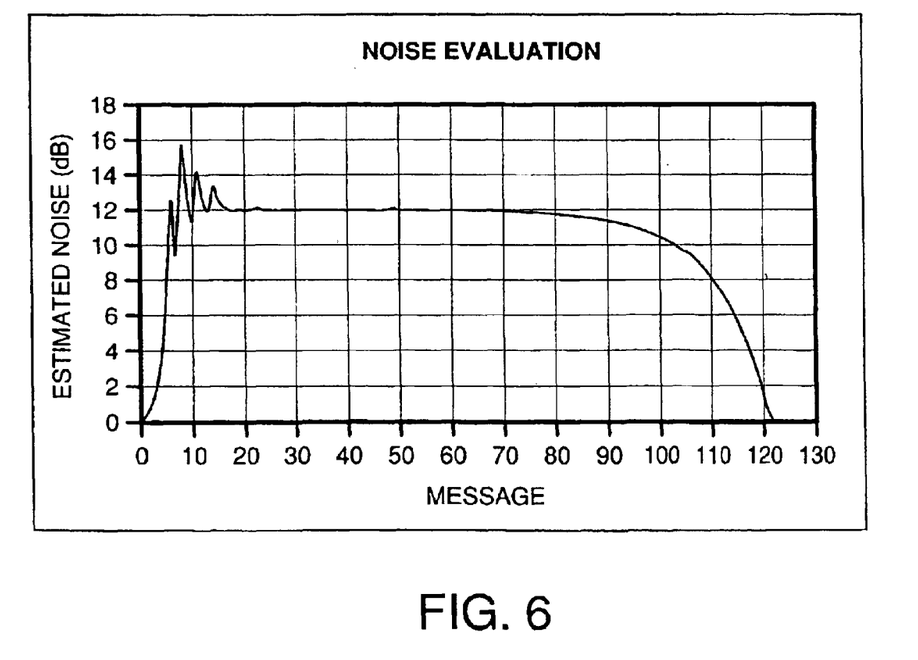
FIG. 6 is a graph illustrating an example of estimated noise versus the number of messages transmitted from a source node to a destination node in the network shown in FIG. 1 as calculated using noise estimation techniques according to an embodiment of the present invention as shown in the flowchart of FIG. 5.
Figure 7:
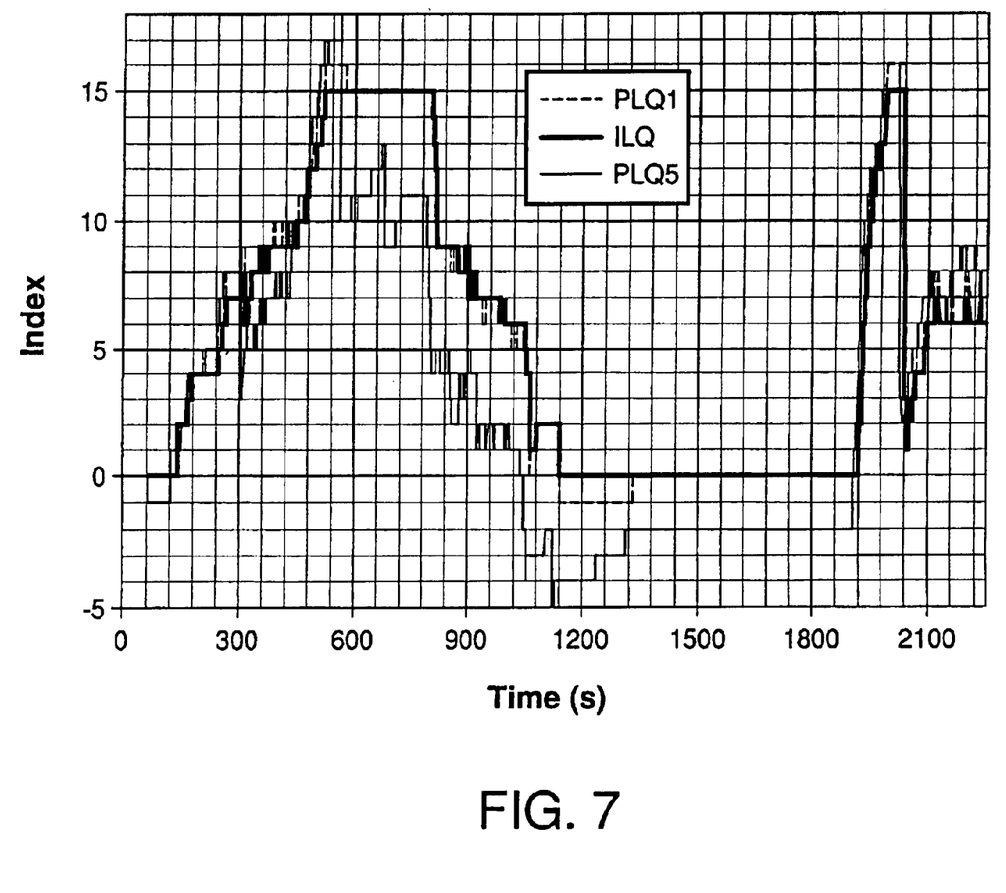
FIG. 7 is a graph illustrating an example of different link quality values representing the quality of a link between a source node and destination node of the network shown in FIG. 1 as calculated according to an embodiment of the present invention.

FIG. 6 is a graph illustrating an example of the manner in which the noise detection process described above with regard to the flowchart in FIG. 5 is used to dynamically estimate the noise level. For example, for the first message, the actual noise at the Destination Terminal causes the Destination Terminal to send a NACK message to the Source Terminal. The upward correction is then set to (0.1*2) or 0.2 in step 1070 and, when added to the initial estimated noise value of zero, the noise value becomes 0.2. The Source Terminal then adjusts the transmission power as discussed in the "Power Computation" section below when sending the second message. However, the actual noise still causes the Destination Terminal to send a NACK message to the Source Terminal. The upward correction is then set to (0.2*2) or 0.4 in step 1070 and, when added to the noise value of 0.2 calculated for the previous message, the new noise value becomes 0.6.

This process repeats as indicated, until the power level is adjusted to such a level (i.e., to compensate for an actual noise level of +12 dB in this example) which results in the Destination Terminal sending an ACK message to the Source Terminal. In this example, this occurs by the time the sixth message is sent, which results in an estimated noise value of 12.6 dB according to the calculations discussed above. Hence, when the seventh message is sent, the power level is sufficient to result in the Destination Terminal sending an ACK message. The process shown in FIG. 5 thus proceeds from step 1010 to step 1020 and, because the upward correction value has risen to 6.4 which is over 0.1, the process proceeds from step 1020 to step 1030. The upward correction value is then halved to 3.2 and subtracted from the noise value, to result in a noise value of (12.6−3.2) or 9.4. The power level is then decreased accordingly for sending the eighth message. However, because the power level has been lowered too much, a NACK message will be sent by the Destination Terminal. This results in the process proceeding to step 1070 where the upward correction value is doubled to 6.4 and added to the noise level of 9.4 to result in a noise level of 15.8.

When the power is thus increased for sending the ninth message, the power level will be sufficient to result in the Destination Terminal receiving the message and sending an ACK message to the Source Terminal. Hence, the process proceeds from step 1010 to step 1020, to step 1030 where the upward correction value of 6.4 is halved to 3.2 and subtracted from the noise value of 15.8, resulting in a noise value of 12.6. It is noted that the power level for the next message will still result in an ACK message being received. Hence, for that message, the process will proceed from step 1010 to step 1020, to step 1030 where the upward correction value will be halved again to 1.6 and subtracted from the noise value. The noise value will thus be reduced to 11.0. However, as can be appreciated from the graph shown in FIG. 6 and the flowchart of FIG. 5, the estimated noise value will stabilize at the actual noise value, which in this example is +12 dB. When the upward correction value is halved enough times to be below the bottom limit of 0.1, when the process reaches step 1020, it will proceed to step 1050 where the downward correction will be used to reduce the noise value by a much smaller amount.

As can be appreciated from the above, the sudden activation of noise source prevented seven of the first ten messages from being received by the Destination Terminal. From that moment, the reliability increased to more then 90%. As indicated in FIG. 6, noise of +12 dB over the receiver sensitivity is received at the Destination Terminal during the first 50 messages. For the rest of the time, no noise is present. That is, in this example, the noise at the Destination Terminal disappears by the time the $50^{th}$ message has been sent. Although the noise stopped when message 50 was transmitted, the nature of the noise evaluator as shown in the flowchart of FIG. 5 begins to lower the estimated noise level significantly only after receiving 30 successive unaffected messages, that is, beginning at message 80, due to the small size of the downward correction value and the small amount (i.e., 10%) by which it is increased for every message.

Power Computation

The ATP computes the theoretical transmit power as a summation of the estimated noise level (increased by 10%), the path loss at the specified time, the receiver sensitivity at maximum data rate (i.e., the noise floor) and two times the fading span. Since the fading span is the same or substantially the same as the standard deviation of the path loss, using two times its value gives the certainty that 95.4% of messages are received at a level higher than the receiver sensitivity, as indicated by the following equation:

$$TT \times P(t) = \text{noise} * 1.1 + pl(t) + \text{NoiseFloor (6)} + 2 * \text{Span} \quad (5)$$

The theoretical transmit power could be larger or smaller than the maximum power that the transmitter can provide.

The computed transmit power TxP(t) is equal to the theoretical transmit power if it is within the power range the transmitter can provide, as indicated by the following equations:

$$TxP(t) = \min(\text{MAX\_POWER}, \max(\text{MIN\_POWER}, TTxP)) \quad (6)$$

$$FTxP(t) = \begin{cases} TxP(t) > pFTxP \Rightarrow TxP(t) \\ TxP(t) \leq pFTxP \Rightarrow \dfrac{TxP(t) * \alpha + pFTxP}{1+\alpha} \end{cases}$$

$$\alpha = \begin{cases} highSpeed \Rightarrow 0.1 \\ slowSpeed \Rightarrow 0.007 \end{cases}$$

Depending on relationship between the computed transmit power TxP and the filtered transmit power used in previous transmission pFTxP, the filtered transmit power FTxP is either computed from the transmit power using the IIF associated to the speed of path loss variation, or is considered as it is. This asymmetric filter allows maintaining high reliability when sudden adverse events happen.

Data Rate Computation

If the theoretical transmit power is smaller than the maximum transmit power, the maximum data rate is used and the theoretical power is equal to the filtered FTxP transmit power. However, if the theoretical transmit power TTxP is larger than the highest power the transmitter can provide, the excess of power is compensated by lowering the data rate DR, as indicated by the following equation:

$$DR = \begin{cases} TTxP > \text{MAX\_POWER} \Rightarrow RateIndex(TTxP - \text{MAX\_POWER}) \\ TTxP \leq \text{MAX\_POWER} \Rightarrow 6 \end{cases} \quad (7)$$

$$RateIndex(p) = \begin{cases} p \geq 6.021 \Rightarrow 3 \\ p \geq 3.01 \wedge p < 6.021 \Rightarrow 4 \\ p \geq 1.76 \wedge p < 3.01 \Rightarrow 5 \\ p < 1.76 \Rightarrow 6 \end{cases}$$

The return values of the RateIndex function are resulting from the conversion of the transmit energy per bit for each data rate. The data transfer rate for a rate index of 6 is 6 MBPS and is used as a reference. The data rate for a rate index of 5 is associated with a data transfer rate of 4 MBPS. The relative energy at 4 MBPS is $10*\log_{10}(6/4)=1.760913$ dB. The other values correspond to 3 MBPS for a rate index of 4, and 1.5 MBPS for a rate index of 3. Lower data rates are used only for control messages, and not for data transfer.

It is noted that the data rate computed in accordance with Equation (7) is filtered using IIF with parameters specific with the speed of path loss change, as indicated by the following equation:

$$FDR = \dfrac{pFDR + DR*\beta}{1+\beta} \quad (8)$$

$$\beta = \begin{cases} slowSpeed \Rightarrow .1 \\ fastSpeed \Rightarrow .05 \end{cases}$$

$$TxDR = \lceil FDR \rceil$$

where the transmitted data rate TxDR is the ceiling of filtered data rate FDR. It is noted that although only cases for slow and fast speeds are shown as an example, the computation of the parameters can have any number of discrete steps, or can be continuously adaptable.

Power and Data Rate Filtering

The computed power and data rate are filtered using IIF for assuring a smooth change of values. The data rate filter is symmetrical, but the power filter is asymmetrical, assuring fast reaction to sudden adverse changes in environment with slow recovery, thus maintaining the reliability of connection to at least 90%.

Fast and Slow Movement

As indicated above, the ATP uses two sets of parameters for filtering the transmit power and data rate. The selection of the proper set of parameters depends on the value of $f_1$, which represents the variation of the path loss as indicated above. If $|f_1| >= 0.0015$ dB/ms, it is considered that the path loss variation is caused by a fast moving vehicle. The differentiation between "fast" and "slow" movement improves the overall quality of the control.

Link Quality

In addition to determining the transmit power level and data transmit rate as discussed above, the ATP further provides information about the quality of the link between Source and Destination Terminals. This information can be used for predicting the behavior of an active the link in next few seconds or when considering the link for participating in a communication route.

The index of link quality ILQ is defined as:

$$ILQ(t) = \text{MAX\_POWER} - FTxP(t) + 6.02 - \text{Gain}(TxDR)$$

As indicated in the graph of FIG. 5, the ILQ is equal with the maximum power increased with 6.02 (the gain for using the lowest data rate) minus the actual used transmit power and the actual gain converted to dB. The ILQ indicates the amount of unused theoretical power for the link. This measure is complementary to the link resistance that measures the currently used energy.

One second predicted link quality PLQ1, which is also shown graphically in FIG. 5, is computed as:

$$PLQ1 = ILQ - 1{,}000 f_1$$

with the $f_1$ factor representing the variation of the path loss measured in dB/ms.

The five second predicted link quality PLQ5 shown in the graph of FIG. 5 is computed as follows:

$$PLQ5 = ILQ - 5{,}000 f_1$$

with the variation of link quality being presented in FIG. 5 at a scale that allows representation as 8 bits numbers, instead of dB.

The Index of Link Quality is useful for judging the current resistance of the link. Small values of ILQ indicate that the link has substantial resistance and may break at any time. The one-second prediction of link quality provides more information in such case. Specifically, smaller than ILQ values of PRQ1 indicate that the link has the tendency to become weaker in time. A negative value of PRQ1 indicates that the link may not be available after one second, and that the route using the link, if any, must be rerouted. On the contrary, values of PRQ1 larger than ILQ indicate that the link quality is improving and, despite the fact it is weak now, it will become better after one second.

The five-second prediction of link quality is useful when a link is considered for being selected as participant in a route. Large values of PLQ5 indicate that the route will be healthy for at least five seconds from now, and can thus be selected for participating in a route. Smaller or negative values of the PLQ5 indicate that the link will become weak or unavailable in less than five seconds and should not be considered as a hop in a new route.

It is further noted that the ATP controls the transmission between the Source Terminal and the Destination Terminal, which is only one link in the chain that is the route between the initial source of data and the final destination. The link quality is the set of information that ATP provides to other software components of the terminal for assuring a high reliability of the network as a system of terminals.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for determining at least one of a power level and rate at which data is transmitted over a link between source and destination nodes in a wireless ad-hoc communication network, comprising:

predicting path loss in said link as a function of time based on information provided to said source node from said destination node pertaining to characteristics of at least two messages that were transmitted by said source node for receipt by said destination node;

determining a noise factor representative of noise at said destination node; and calculating at least one of said power level and rate at which said data is transmitted over said link from said source node to said destination node based on said predicted path loss and said noise factor.

2. A method as claimed in claim 1, wherein:

said calculating includes calculating said power level and said rate.

3. A method as claimed in claim 1, wherein:

said calculating includes calculating said power level based on said predicted path loss and said noise factor, and determining said rate based an said calculated power level.

4. A method as claimed in claim 1, wherein:

said noise factor determining determines said noise factor dynamically based on respective message information provided to said source node from said destination node in response to each of a plurality of said messages transmitted by said source node.

5. A method as claimed in claim 4, wherein said noise factor determining comprises:

increasing or decreasing an estimated noise factor based on each said respective message information for said plurality of messages to realize said noise factor.

6. A method as claimed in claim 1, wherein:

said calculating includes calculating at least one of said power level and said rate based on said predicted path loss, said noise factor, short term fading experienced by said message and sensitivity of a receiver of said destination node.

7. A method as claimed in claim 6, further comprising:

computing said short term fading based on a standard deviation of a strength at which said message is received by said receiver of said destination node.

8. A method as claimed in claim 6, further comprising:

computing said receiver sensitivity based on energy used by a transmitter of said source node to transmit a bit of information of said message at a particular data rate.

9. A method as claimed in claim 1, wherein:

said noise factor determining determines said noise factor based on a level of correctness at which a receiver of said destination node receives said message.

10. A method as claimed in claim 1, further comprising:

calculating a quality of a link over which said message is sent from said source node to said destination node based on said calculated power level and said rate.

11. A method as claimed in claim 1, wherein:

said calculating calculates said data rate based on an amount of energy used by a transmitter of said source node to transmit a bit of information of said message.

12. A computer-readable medium of instructions, adapted to determining at least one of a power level and rate at which data is transmitted over a link between source and destination nodes in a wireless ad-hoc communication network, said instructions comprising:

a first set of instructions, adapted to predict path loss in said link as a function of time based on information provided to said source node from said destination node pertaining to characteristics of at least two messages that were transmitted by said source node for receipt by said destination node;

a second set of instructions, adapted to determine a noise factor representative of noise at said destination node; and a third set of instructions, adapted to calculate at least one of said power level and rate at which said data is transmitted over said link from said source node to said destination node based on said predicted path loss and said noise factor.

13. A computer-readable medium of instructions as claimed in claim 12, wherein:

said third set of instructions is adapted to calculate said power level and said rate.

14. A computer-readable medium of instructions as claimed in claim 12, wherein:

said third set of instructions is adapted to calculate said power level based on said predicted path loss and said noise factor, and to determine said rate based on said calculated power level.

15. A computer-readable medium of instructions as claimed in claim 12, wherein:

said second set of instructions is adapted to determine said noise factor dynamically based on respective message information provided to said source node from said destination node in response to each of a plurality of said messages transmitted by said source node.

16. A computer-readable medium of instructions as claimed in claim 15, wherein:

said second set of instructions is adapted to increase or decrease an estimated noise factor based on each said respective message information for said plurality of messages to realize said noise factor.

17. A computer-readable medium of instructions as claimed in claim 12, wherein:

said third set of instructions is further adapted to calculate at least one of said power level and said rate based on said predicted path loss, said noise factor, short term fading experienced by said message and sensitivity of a receiver of said destination node.

18. A computer-readable medium of instructions as claimed in claim 17, further comprising:
a fourth set of instructions, adapted to compute said short term fading based on a standard deviation of a strength at which said message is received by said receiver of said destination node.

19. A computer-readable medium of instructions as claimed in claim 17, further comprising:
a fifth set of instructions, adapted to compute said receiver sensitivity based on energy used by a transmitter of said source node to transmit a bit of information of said message at a particular data rate.

20. A computer-readable medium of instructions as claimed in claim 12, wherein:
said second set of instructions is adapted to determine said noise factor based on a level of correctness at which a receiver of said destination node receives said message.

21. A computer-readable medium of instructions as claimed in claim 12, further comprising:
a fifth set of instructions, adapted to calculate a quality of a link over which said message is sent from said source node to said destination node based on said calculated power level and said rate.

22. A computer-readable medium of instructions as claimed in claim 12, wherein:
said third set of instructions calculates said data rate based on an amount of energy used by a transmitter of said source node to transmit a bit of information of said message.

23. A method for determining at least one of a power level and rate at which data is transmitted over a link between source and destination nodes in a wireless ad-hoc communication network, comprising:
computing path loss in said link based on information provided to said source node from said destination node pertaining to characteristics of a message that was transmitted by said source node for receipt by said destination node;
determining a noise factor representative of noise at said destination node; and
calculating at least one of said power level and rate at which said data is transmitted over said link from said source node to said destination node based on said path loss, said noise factor, short term fading experienced by said message and sensitivity of a receiver of said destination node.

24. A method as claimed in claim 23, further comprising:
computing said short term fading based on a standard deviation of a strength at which said message is received by said receiver of said destination node.

25. A method as claimed in claim 23, further comprising:
computing said receiver sensitivity based on energy used by a transmitter of said source node to transmit a bit of information of said message at a particular data rate.

26. A method for determining at least one of a power level and rate at which data is transmitted over a link between source and destination nodes in a wireless ad-hoc communication network, comprising:
computing path loss in said link based on information provided to said source node from said destination node pertaining to characteristics of a message that was transmitted by said source node for receipt by said destination node;
determining a noise factor representative of noise at said destination node; and
calculating at least one of said power level and rate at which said data is transmitted over said link from said source node to said destination node based on said path loss and said noise factor, such that said data rate is calculated based on an amount of energy used by a transmitter of said source node to transmit a bit of information of said message.

27. A computer-readable medium of instructions, adapted to determining at least one of a power level and rate at which data is transmitted over a link between source and destination nodes in a wireless ad-hoc communication network, said instructions comprising:
a first set of instructions, adapted to compute path loss in said link based on information provided to said source node from said destination node pertaining to characteristics of a message that was transmitted by said source node for receipt by said destination node;
a second set of instructions, adapted to determine a noise factor representative of noise at said destination node; and
a third set of instructions, adapted to calculate at least one of said power level and rate at which said data is transmitted over said link from said source node to said destination node based on said path loss, said noise factor, short term fading experienced by said message and sensitivity of a receiver of said destination node.

28. A computer-readable medium of instructions as claimed in claim 27, further comprising:
a fourth set of instructions, adapted to compute said short term fading based on a standard deviation of a strength at which said message is received by said receiver of said destination node.

29. A computer-readable medium of instructions as claimed in claim 27, further comprising:
a fifth set of instructions, adapted to compute said receiver sensitivity based on energy used by a transmitter of said source node to transmit a bit of information of said message at a particular data rate.

30. A computer-readable medium of instructions, adapted to determining at least one of a power level and rate at which data is transmitted over a link between source and destination nodes in a wireless ad-hoc communication network, said instructions comprising:
a first set of instructions, adapted to compute path loss in said link based on information provided to said source node from said destination node pertaining to characteristics of a message that was transmitted by said source node for receipt by said destination node;
a second set of instructions, adapted to determine a noise factor representative of noise at said destination node; and
a third set of instructions, adapted to calculate at least one of said power level and rate at which said data is transmitted over said link from said source node to said destination node based on said path loss and said noise factor, such that said data rate is calculated based on an amount of energy used by a transmitter of said source node to transmit a bit of information of said message.

31. A method as claimed in claim 1, wherein:
said predicting step employs a forget factor which treats older said information less significantly than newer said information in predicting said path loss.

32. A method as claimed in claim 31, wherein:
said predicting step applies a respective value of said forget factor to each respective said information representing the characteristics of a respective message, to weigh said information in predicting said path loss.

33. A method as claimed in claim 32, wherein:

each said respective forget factor value has a value between 0 and 1.

34. A computer-readable medium of instructions as claimed in claim 12, wherein:

said first set of instructions employs a forget factor which treats older said information less significantly than newer said information in predicting said path loss.

35. A computer-readable medium of instructions as claimed in claim 34, wherein:

said first set of instructions applies a respective value of said forget factor to each respective said information representing the characteristics of a respective message, to weigh said information in predicting said path loss.

36. A computer-readable medium of instructions as claimed in claim 35, wherein:

each said respective forget factor value has a value between 0 and 1.

37. A method as claimed in claim 1, wherein:

the calculating calculates the transmit power level and data rate to minimize an amount of energy used for transmitting said data over said link.

38. A computer-readable medium of instructions as claimed in claim 12, wherein:

said third set of instructions calculates the transmit power level and data rate to minimize an amount of energy used for transmitting said data over said link.

* * * * *